United States Patent
Gurudath et al.

(10) Patent No.: US 11,734,814 B2
(45) Date of Patent: Aug. 22, 2023

(54) ENHANCED PRINT DEFECT DETECTION

(71) Applicants: Nikita Gurudath, Boulder, CO (US); Scott R. Johnson, Erie, CO (US); Nathan Young, Boulder, CO (US); Ziling Zhang, Boulder, CO (US)

(72) Inventors: Nikita Gurudath, Boulder, CO (US); Scott R. Johnson, Erie, CO (US); Nathan Young, Boulder, CO (US); Ziling Zhang, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 701 days.

(21) Appl. No.: 16/712,985

(22) Filed: Dec. 12, 2019

(65) Prior Publication Data

US 2021/0183036 A1    Jun. 17, 2021

(51) Int. Cl.
*G06T 7/00* (2017.01)
*B41J 2/045* (2006.01)
*B41J 2/165* (2006.01)
*B41J 2/21* (2006.01)
*B41J 29/393* (2006.01)

(52) U.S. Cl.
CPC ............. *G06T 7/001* (2013.01); *B41J 2/0451* (2013.01); *B41J 2/16579* (2013.01); *B41J 2/16585* (2013.01); *B41J 2/2142* (2013.01); *B41J 2/2146* (2013.01); *B41J 29/393* (2013.01); *B41J 2/04586* (2013.01); *B41J 2029/3935* (2013.01); *G06T 2207/10004* (2013.01); *G06T 2207/20084* (2013.01); *G06T 2207/30108* (2013.01); *G06T 2207/30144* (2013.01)

(58) Field of Classification Search
None
See application file for complete search history.

(56) References Cited

U.S. PATENT DOCUMENTS

| | | |
|---|---|---|
| 6,905,186 B2 | 6/2005 | Kojima |
| 7,287,824 B2 | 10/2007 | Subirada et al. |
| 8,814,316 B2 | 8/2014 | Kido |
| 8,820,880 B2 | 9/2014 | Chandu et al. |
| 10,155,405 B2 | 12/2018 | Kyoso |

(Continued)

FOREIGN PATENT DOCUMENTS

| | | |
|---|---|---|
| JP | 2015083359 A | 4/2015 |
| JP | 2019101540 A | 6/2019 |

OTHER PUBLICATIONS

Chen-Chu, T., et al., "Test Pattern and Drop Tracing for Nozzle Healthy Diagnostic", Ingenta Connect, Apr. 22, 2006 (Year: 2006).*

(Continued)

*Primary Examiner* — Emily C Terrell
*Assistant Examiner* — Nathan J Bloom
(74) *Attorney, Agent, or Firm* — Duft & Bornsen, PC

(57) ABSTRACT

Systems and methods are provided for. One embodiment is a system that includes an interface configured to receive an image of media printed on with print data, and memory configured to store defect reference data of nozzles belonging to printheads of a printer. The system also includes a print defect controller configured to detect a nozzle defect in the image based on a comparison of the image with the print data, and to determine a type of the nozzle defect based on a comparison of the nozzle defect with the defect reference data.

29 Claims, 7 Drawing Sheets

(56) References Cited

U.S. PATENT DOCUMENTS

| | | |
|---|---|---|
| 2010/0149247 A1 | 6/2010 | Yip et al. |
| 2013/0182972 A1 | 7/2013 | Jing et al. |
| 2013/0329144 A1 | 12/2013 | Fukasawa et al. |
| 2015/0177158 A1* | 6/2015 | Cheverton ............. G05B 15/02 700/119 |
| 2017/0190194 A1 | 7/2017 | Zollner et al. |
| 2019/0168514 A1 | 6/2019 | Gazala |
| 2019/0215410 A1 | 7/2019 | d'Armancourt et al. |
| 2019/0248154 A1* | 8/2019 | Hiramoto ............... B41J 2/2146 |
| 2021/0279858 A1* | 9/2021 | Stoppe .................... G06T 7/70 |
| 2021/0291513 A1* | 9/2021 | Billow ................... B41J 2/2146 |
| 2022/0063261 A1* | 3/2022 | Ishibashi .............. B41J 2/16508 |

OTHER PUBLICATIONS

Nagata, Fusaomi, et al. "Defect detection method using deep convolutional neural network, support vector machine and template matching techniques." Artificial Life and Robotics 24.4 (Jul. 2019): 512-519. (Year: 2019).*

European Search Report; Application EP20213007; dated May 14, 2021.

Larry Willoughby; Machine vision system makes light of high-speen printing inspection.

Marie Vans et al; Automatic visual inspection and defect detection on variable data prints; Journal of Electronic imaging 20(1) 013010 Jan.-Mar. 2011.

Japanese office action; Application 2020-205809; dated Nov. 2, 2021.

* cited by examiner

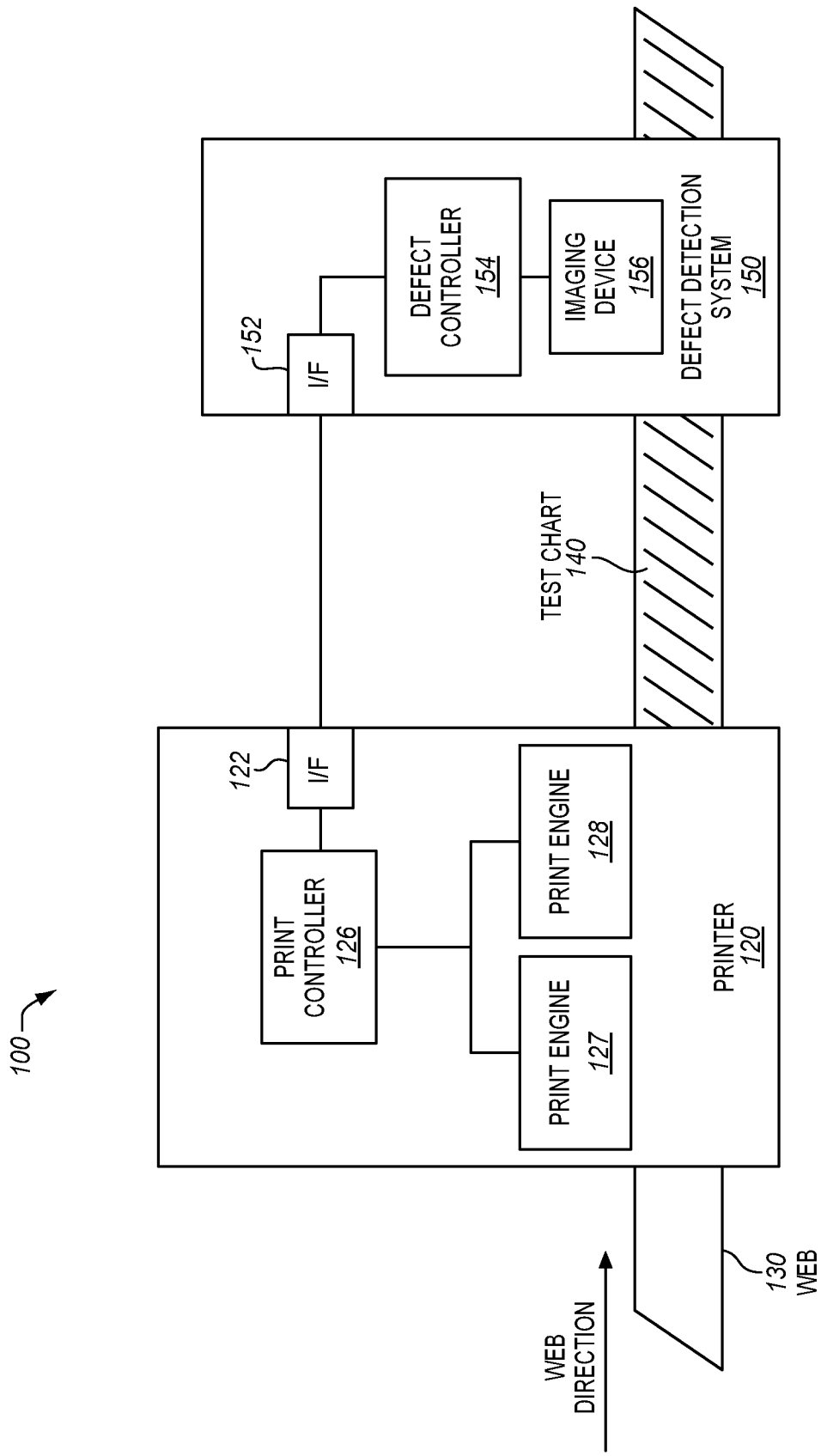

ENHANCED PRINT DEFECT DETECTION

TECHNICAL FIELD

The invention relates to the field of printing, and in particular, to detecting print defects.

BACKGROUND

An inkjet production printer is a high-speed printer used for volume printing (e.g., one hundred pages per minute or more), and may include continuous-forms printers that print on a web of print media stored on a large roll. While a continuous-forms inkjet printer operates, the web is quickly passed underneath the nozzles of printheads of the printer, which discharge ink onto the web at intervals to form pixels.

Although most of the ink dispensed by the printheads is transferred to the web, some amount of ink remains on the nozzles of the printheads. Over time, congealed ink, contaminants, or nozzle structural failures may form which clogs or partially clogs nozzles, resulting in defective ink jets that degrades print quality. Determining the particular type and location of a print defect informs follow-up decisions (e.g., cleaning operations) to compensate for the print defect and improve print quality.

Print defect identification is typically performed manually by a trained print operator at the beginning of a day or print cycle. However, even if the operator has a lot of experience and training to distinguish among the various types of print defects, human print defect analysis is time consuming and subject to inaccuracies.

SUMMARY

Embodiments herein describe enhanced print defect detection. A defect detection system of a printer distinguishes between different types of print defects automatically with high precision and speed. Using reference data of previously identified defect types, the defect detection system is able to determine the location and type of defect for individual nozzles of the printer. Types of nozzle defects present in a printhead are determined quickly and accurately, and may be used to inform maintenance decisions for improved efficiency of maintenance procedures performed for the printer.

One embodiment is a system that includes an interface configured to receive an image of media printed on with print data, and memory configured to store defect reference data of nozzles belonging to printheads of a printer. The system also includes a print defect controller configured to detect a nozzle defect in the image based on a comparison of the image with the print data, and to determine a type of the nozzle defect based on a comparison of the nozzle defect with the defect reference data.

Another embodiment is a method that includes storing, in memory, defect reference data of nozzles belonging to printheads of a printer. The method also includes receiving an image of media printed on with print data, and detecting a nozzle defect in the image based on a comparison of the image with the print data. The method further includes determining a type of the nozzle defect based on a comparison of the nozzle defect with the defect reference data.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 1 is a diagram of a printing system in an illustrative embodiment.

DETAILED DESCRIPTION

Figure 2A:
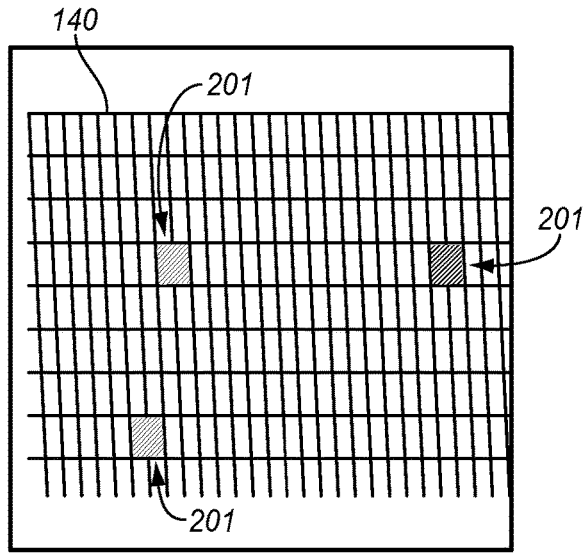
FIG. 2A shows jet-out defects on the test chart.

The figures and the following description illustrate specific illustrative embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

FIG. 1 is a diagram of a print system 100 in an illustrative embodiment. The print system 100 includes a printer 120 and a defect detection system 150. Under normal printing operation, the printer 120 receives a print job, generates rasterized print data for the print job with the print controller 126, and transmits the rasterized print data for the print job to one or more print engines 127-128. The print engines 127-128 mark the web 130 of print media (e.g., paper, textile, printable substrate) with ink (e.g., marking material, colorant, etc.) according to the rasterized print data, thus producing printed output.

Occasionally, to verify that the print engines 127-128 are operating correctly, the print controller 126 instructs the print engines 127-128 to print a test chart 140 based on test chart print data onto web 130 that can be analyzed manually or by the defect detection system 150 for print defects. The defect detection system 150 includes an interface 152, a defect controller 154, and one or more imaging device(s) 156. The imaging device 156 may comprise a camera, scanner, densitometer, spectrophotometer or other suitable component for acquiring images of printed content. The test chart 140 may be printed on the web 130 separately from the print jobs or with the print jobs (e.g. on sections of the web 130 separate from the sections of the web 130 printed with the print jobs).

After obtaining an image of the test chart 140 via the imaging device 156, the defect controller 154 analyzes the image for jet defects. For example, the defect controller 154 may be configured to determine which printheads or nozzles printed the defects based on the location of the defect in the test chart 140. The defect detection system 150 and printer 120 may communicate via interfaces 122/152 (e.g., an Ethernet interface, wireless interface, etc.). For instance, the print controller 126 may transmit a rasterized version of the print data corresponding to test chart 140 to the defect detection system 150 for comparison to an image of the test chart 140 to determine whether there are any discrepancies that indicate printing errors, and the defect detection system 150 may report (e.g., transmit) print defect data to the printer 120 or other systems to inform maintenance procedures.

Figure 2B:
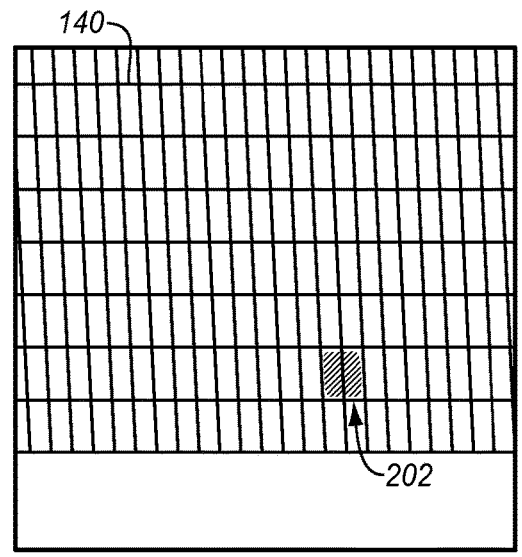
FIG. 2B shows a deviated jet defect on the test chart.
Figure 2C:
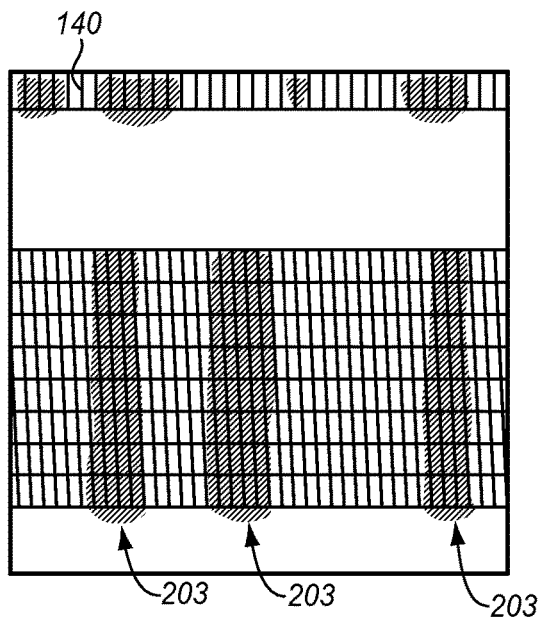
FIG. 2C shows delaminated head defects on the test chart.
Figure 2D:
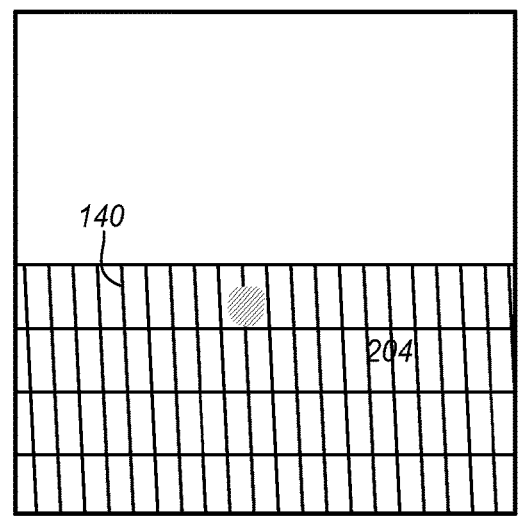
FIG. 2D shows an unknown defect on the test chart.

As described in greater detail below, the defect controller 154 is enhanced to classify print defects by category or type. FIGS. 2A-D illustrate different types of print defects. FIG. 2A shows jet-out defects 201 on the test chart 140. Jet-out defects 201 may be caused by a complete blocking of a nozzle (e.g., no ink ejected). FIG. 2B shows a deviated jet defect 202 on the test chart 140. Deviated jet defects 202 may be caused by a partial blocking of a nozzle (e.g., ink ejected at least partially to an unintended location on web 130). FIG. 2C shows delaminated print head defects 203 on the test chart 140. Delaminated head defects 203 may be caused by film on the printhead array peeling off from wear and tear (e.g., a plurality of adjacent nozzles partially blocked or fully blocked). FIG. 2D shows an unknown defect 204 on the test chart 140. Unknown defects 204 may comprise a category of defects other than that which can be classified into the other print defect categories. Those skilled in the art will appreciate that further nozzle defect types or sub-types may also be defined.

Figure 3:
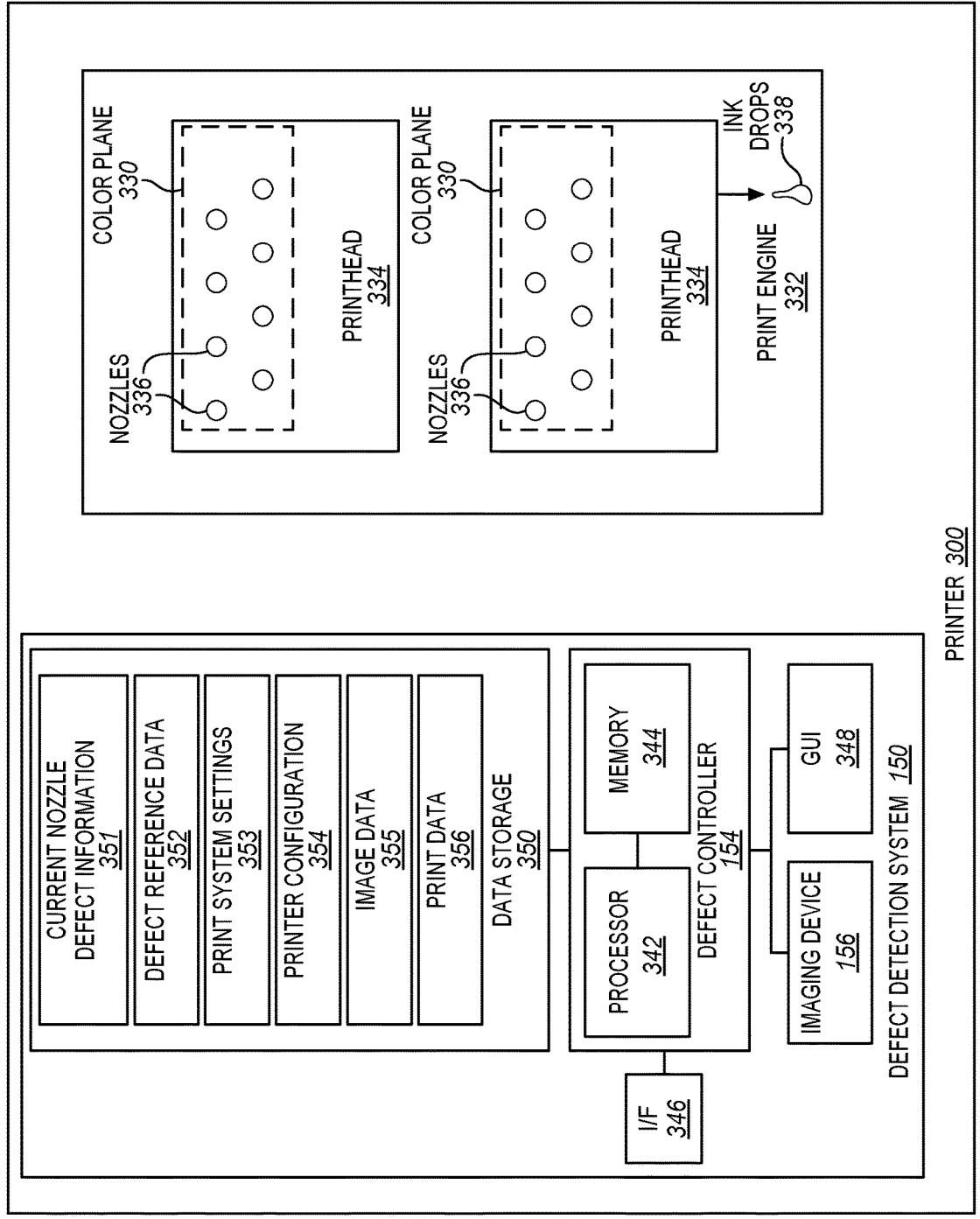
FIG. 3 is a block diagram of a printer in an illustrative embodiment.

FIG. 3 is a block diagram of a printer 300 in an illustrative embodiment. The printer 300 includes the defect detection system 150 enhanced to determine the type or category of a particular print defect. That is, the defect detection system 150 is configured to categorize print defects as one of a jet-out defect 201, deviated jet defect 202, delaminated head defect 203, or unknown defect 204. By classifying print defects by type, the defect detection system 150 is able to provide operational health data of the printer 300 and facilitate corrective actions to take for efficiently improving print quality. Those skilled in the art will appreciate that defect detection system 150 may be used for other defect type also.

The printer 300 generally includes a plurality of color planes 330 (e.g., cyan, magenta, yellow, and black) and print engines 332. Each print engine 332 may process print data for one or a plurality of color planes 330 and control one or a plurality of printheads 334 based on the print data. Each printhead 334 includes an array of nozzles 336 that eject drops of ink 338 for printing. The nozzles 336 of each printhead 334 may be assigned to one color plane or divided between a plurality of color planes 330. The printheads 334 may be configured physically in the web direction and/or orthogonal to the web direction. As earlier described, in the course of normal printing operation one or more of the nozzles 336 may clog with ink, resulting in print defects. Additionally, each printhead 334 may include hundreds of nozzles 336. Due to quantity of ink drops 338 jetted by nozzles 336, the small individual size of the ink drops 338, and similarities in resemblance of different defect types to the human eye, it is difficult and time consuming even for a trained print operator to analyze printed test charts for defect types.

The defect detection system 150 is enhanced with the defect controller 154 configured to detect a nozzle defect in an image based on a comparison of the image with print data 356, and to determine a type of the nozzle defect based on a comparison of the nozzle defect with the defect reference data. In doing so, the defect controller 154 may take into account data stored in data storage 350, including any combination of current nozzle defect information 351, defect reference data 352, and print system settings 353. Examples of current nozzle defect information 351 include any combination of nozzle defect type, corresponding nozzle 336 location, corresponding printhead 334 identification, corresponding print engine 332, corresponding printer 300 and/or color plane 330. Examples of print system settings 353 include a print resolution, selected test pattern type, media type, and/or print engine parameters (e.g., print engine model, print width, paper handling orientation in the print engine, printhead type, ink type, etc.).

The data storage 350 may also store image data 355 of the test chart 140 captured by the imaging device 156 and/or print data 356 corresponding to the test chart 140. Additionally, the data storage 350 may store printer configuration information 354 that may comprise information that correlates print locations, nozzles 336, printheads 334, print engines 332, color planes 330, and/or ink types (e.g. ink sets or specific ink colors). The defect controller 154 may be communicatively coupled with an interface 346 and/or a graphical user interface 348 for receiving user input and/or displaying notifications to the user of the printer 300.

While the specific hardware implementation of the defect controller 154 is subject to design choices, one particular embodiment may include one or more processors 342 coupled with a memory 344. The processor 342 includes any electronic circuits and/or optical circuits that are able to perform functions. For example, a processor may include one or more Central Processing Units (CPU), Graphics Processing Unit (GPU), microprocessors, Digital Signal Processors (DSPs), Application-Specific Integrated Circuits (ASICs), Programmable Logic Devices (PLD), control circuitry, etc. Some examples of processors include Intel Core processors, Advanced Reduced Instruction Set Computing (RISC) Machines (ARM) processors, etc. The memory 344 includes any hardware device that is able to store data. The memory 344 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. The data storage 350 may similarly be implemented by any combination of memory devices or components.

The particular arrangement, number, and configuration of components described with respect to FIG. 3 is an example for purposes of discussion and are non-limiting. For example, though the defect detection system 150 is shown as incorporated in the printer 300, portions or an entirety of the defect detection system 150 and functions performed thereby may be implemented in a separate system that is near to the printer 300 (e.g. Digital Front End (DFE)) or remotely as a standalone system (e.g., cloud implementation) in communication with the printer 300. Illustrative details of the operation of the defect detection system 150 will be discussed with regard to FIGS. 4-5.

Figure 4:
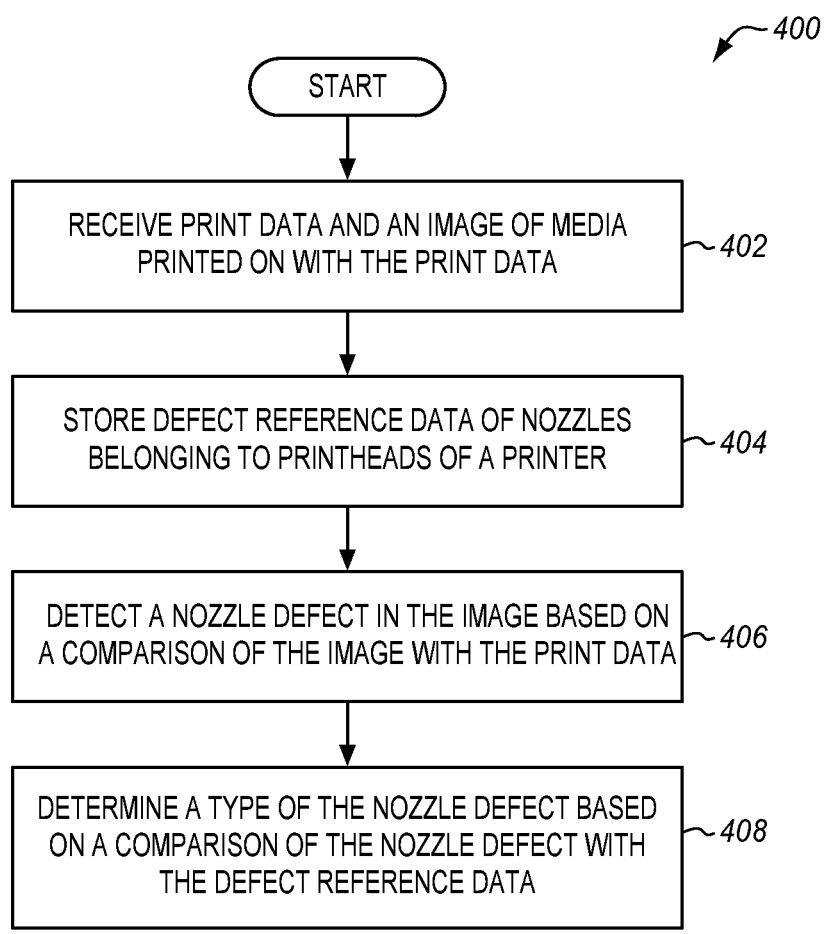
FIG. 4 is a flowchart illustrating a method of determining a type of print defect in an illustrative embodiment.

FIG. 4 is a flowchart illustrating a method 400 of determining a type of print defect in an illustrative embodiment. The steps of method 400 are described with reference to the printer 300 and defect detection system 150 of FIG. 3, but those skilled in the art will appreciate that method 400 may be performed in other systems. The steps of the flowcharts described herein are not all inclusive and may include other steps not shown. The steps described herein may also be optionally performed or performed in an alternative order.

In step 402, the defect controller 154 may receive (e.g., via interface 346) and/or store (e.g., in data storage 350 or a memory) print data (e.g., print data 356), and an image of media printed on with the print data (e.g., image data 355). Print data 356 corresponds to the source print data that instructed the printing of test chart 140 and may be in any suitable format for processing such as bitmaps, print description language or print job. In some embodiments, print data 356 for a test chart is incorporated and available within defect reference data 352. In step 404, the defect controller 154 stores (e.g., in data storage 350 or a memory) defect reference data 352 of nozzles 336 belonging to printheads 334 of a printer 300. The defect reference data 352 may include rules and/or characteristics (e.g., defect image patterns) for the defect controller 154 to use for interpreting the input image and determining defect types. In some embodiments, defect reference data 352 includes rules for determining optical density variations beyond a threshold (e.g., missing or unintended ink placement) in image data 355 locations using a template based on test chart 140. The defect reference data 352 may be derived from images that exhibit characteristics of a previously defined print defect type. For example, the defect reference data 352 may be based on example print defect images that have been previously categorized either manually or by the defect controller 154. Defect reference data 352 may be available for each category of print defects (e.g., a jet-out defect category, deviated defect category, delaminated head defect category, and an unknown category).

In step 406, the defect controller 154 detects a nozzle defect in the image based on a comparison of the image with the print data 356. In doing so, the defect controller 154 may analyze image data 355 of the test chart 140 for discrepancies with print data 356 and stores current nozzle defect information 351 in data storage 350. Additionally, the defect controller 154 may correlate defect locations within the test chart 140 or image data 355 with individual nozzles 336, printheads 334, print engines 332, and/or printer 300 that printed a defect based on information of the printer configuration 354 and/or print data 356 stored in data storage 350.

In step 408, the defect controller 154 determines a type of the nozzle defect based on a comparison of the nozzle defect image characteristics with the defect reference data 352. For instance, the defect controller 154 may identify a matching or similar pattern in the defect reference data 352 or a common characteristic among defects within the same category, and determine the category to which the nozzle defect belongs based on a match of characteristics in the nozzle defect with that in the pattern or commonality defined in the defect reference data 352. As earlier described, the defect controller 154 may determine whether the nozzle defect is one of a jet-out (caused due to complete blocking of a nozzle), a deviated jet (caused by a partial blocking of a nozzle), delaminated head (caused by film on the printhead array peeling off from wear and tear), and unknown (other causes). In some embodiments, the defect controller 154 determines a type of the nozzle defect with look up tables, programmed logic, and/or trained machine learning processor(s). The method 400 provides a benefit over prior techniques by assigning a print defect to a particular classification of inkjet nozzle defects without reliance on trained human operators.

Figure 5:
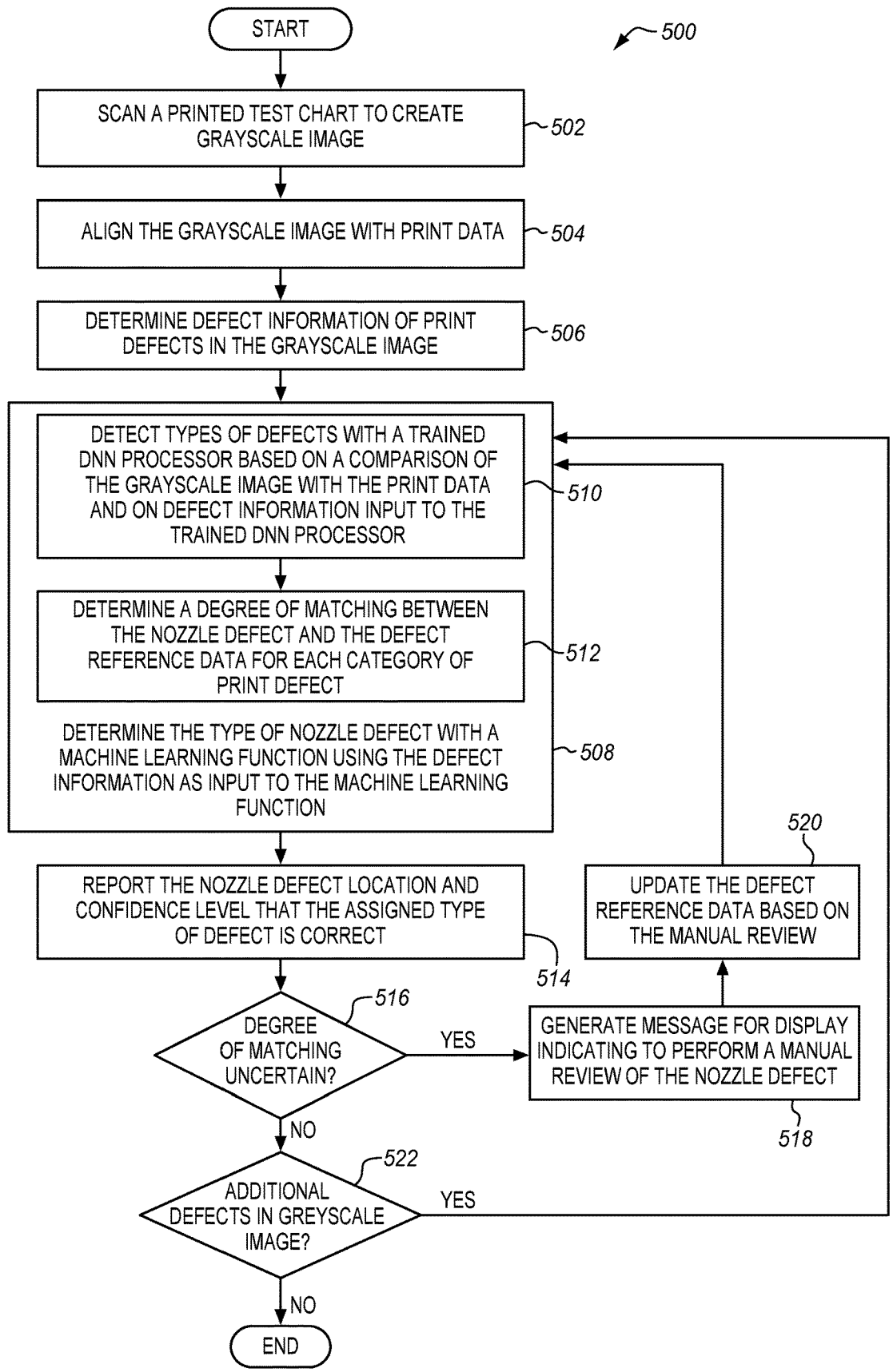
FIG. 5 is a flowchart illustrating a method of determining a type of print defect in another illustrative embodiment.

FIG. 5 is a flowchart illustrating a method 500 of determining a type of print defect in another illustrative embodiment. The steps of method 500 are described with reference to the printer 300 and defect detection system 150 of FIG. 3, but those skilled in the art will appreciate that method 500 may be performed in other systems. The steps of the flowcharts described herein are not all inclusive and may include other steps not shown. The steps described herein may also be optionally performed or performed in an alternative order.

In step 502, the imaging device 156 scans or captures a printed test chart to create a grayscale image (e.g., image data 355). If image data 355 has been stored in data storage 350, then step 502 may be optionally skipped. In step 504, the defect controller 154 aligns the grayscale image with the print data 356. The alignment may include adjustment of comparison inputs to account for the edge registration of print engine(s) 332 (e.g., center, left, or right justified) and/or skew. For example, if the printed test master is not printed on a full width of the medium, the defect controller 154 may align the image to left if a first print engine printed the chart, and align the image to the right if a second print engine printed the test chart. Additionally, the defect controller 154 may adjust image data 355 for stretching/shrinkage in the printed medium, and may apply a position correction that is varied for each printhead to better align the grayscale image to the print data 356 for each specific printhead.

Figure 6:
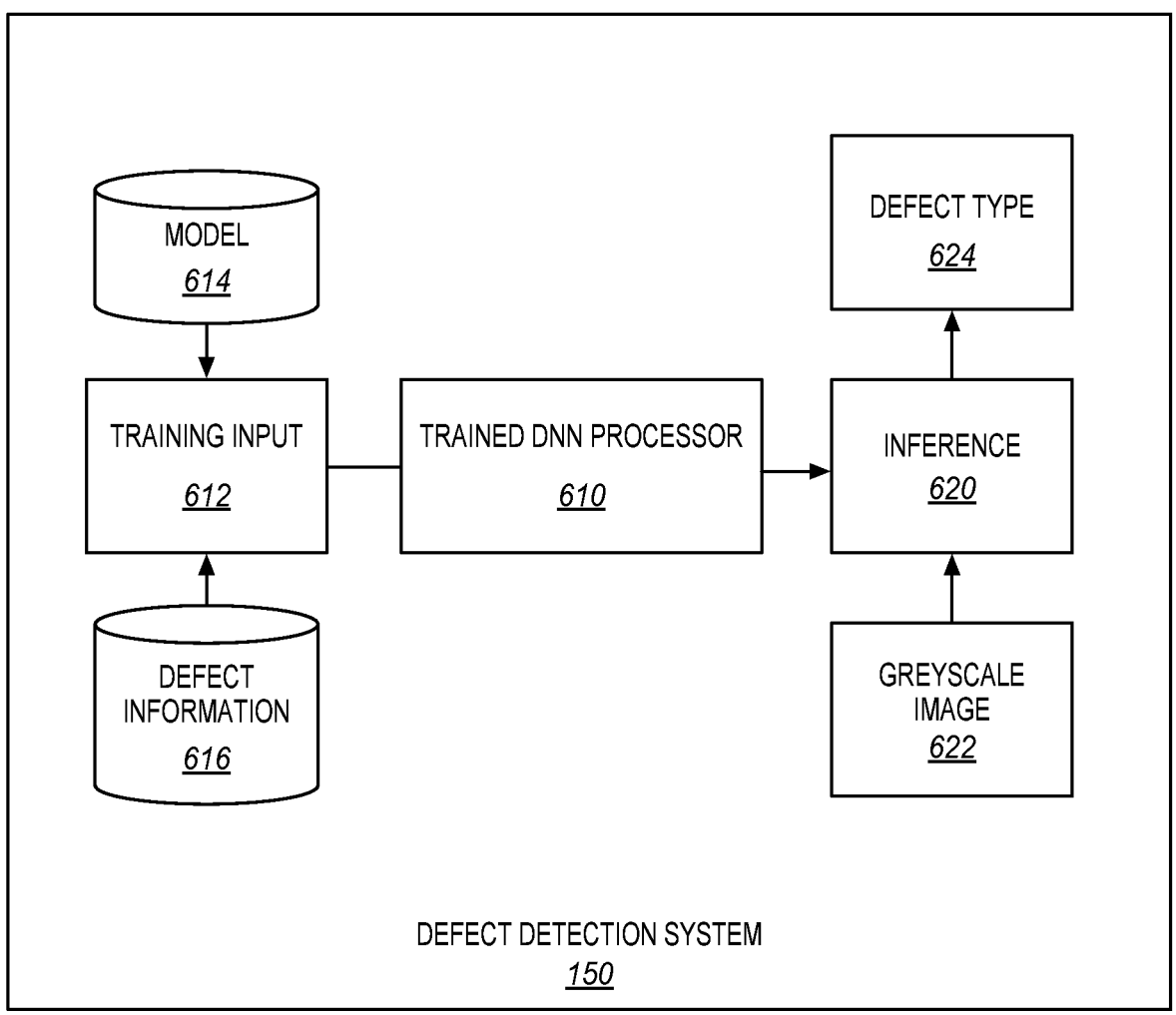
FIG. 6 is a block diagram of the defect detection system implementing a machine learning function in an illustrative embodiment.

In step 506, the defect controller 154 determines defect information of one or more print defects in the grayscale image. And, in step 508, the defect controller 154 determines the type of nozzle defect with a machine learning function using the defect information as input to the machine learning function. FIG. 6 is a block diagram of the defect detection system 150 implementing a machine learning function in an illustrative embodiment. The defect detection system 150 includes a trained Deep Neural Network (DNN) processor 610 to automatically detect and localize multiple types of jetting defects at an individual nozzle level.

The DNN processor 610 receives trained input via training input 612 that takes into account a model 614 and defect information 616. The trained DNN processor 610 is configured to produce inference 620 that analyzes pixels in the greyscale image 622 and assigns a defect type 624 to an individual pixel based on pattern recognition. In some embodiments, the trained DNN processor 610 implements as class of neural networks referred to as Convolutional Neural Networks (CNN). In some embodiments, the DNN processor 610 is trained with training input 612 that includes test chart 140 of method 500.

Returning to FIG. 5, step 508 may comprise further steps 510-512. In step 510, the trained DNN processor 610 detects types of print defects based on a comparison of the greyscale image 622 with the print data 356, and also based on defect information 616 input to the trained DNN processor 610. The defect information 616 may include the defect reference data 352, defect location, and/or print system settings 353. For example, the trained DNN processor 610 may determine the type of print defect based, at least part, on the print engine 332 that printed the defect and the location of the defect relative to the print engine 332. In some embodiments, the model 614 may be trained specific to a print engine 332, printhead 334, media type, etc. to adapt to changing configurations/specifications of the printer 300 to obtain higher detection accuracy.

In step 512, the trained DNN processor 610 determines a degree of matching between a nozzle defect detected in the greyscale image 622 and the defect reference data 352 for one of or each category of print defect. The degree of matching may include a percentage between zero and one hundred indicating a prediction or confidence level that the nozzle defect belongs to one of the specific predefined nozzle defects in the defect reference data 352. In step 514, the defect controller 154 reports the nozzle defect location and confidence level that the assigned type of defect is correct for the nozzle defect.

In step 516, the defect controller 154 determines whether the degree of matching is uncertain for the nozzle defect (e.g., whether the degree of matching is beyond a threshold for each category of defect). If so, the method 500 proceeds to step 518, and the defect controller 154 generates a message for display indicating to perform a manual review of the nozzle defect. Then, in step 520, the defect controller 154 updates the defect reference data 352 based on received manual review data of the nozzle defect (e.g., reviewed nozzle defect data received via GUI 348 and/or I/F 346), and the method 500 returns to step 508. Accordingly, the trained DNN processor 610 may generate pixel masks for different defect categories trained with hand-labeled datasets. This enables the trained DNN processor 610 to adapt to real world input variation and noise in the original training set to continuously improve defect type prediction accuracy. Moreover, difficult cases with low confidence scores may be automatically collected to grow the training dataset, and other sub-categories of unknown defects may be discovered and incorporated in the future.

Otherwise, if the degree of matching is certain, the method 500 proceeds to step 522 and the defect controller 154 determines whether there are additional defects in the greyscale image 622. If so, the method 500 returns to step 508 and repeats. Otherwise, the method 500 ends. Accordingly, the method 500 provides a benefit over prior techniques by rapidly and automatically distinguishing between different types of print defects with high accuracy. Although certain steps of method 500 are described with respect to the defect controller 154 or the trained DNN processor 610, it will be appreciated that the steps of the method 500 may optionally be performed in alternative systems or types of processor(s).

Figure 7:
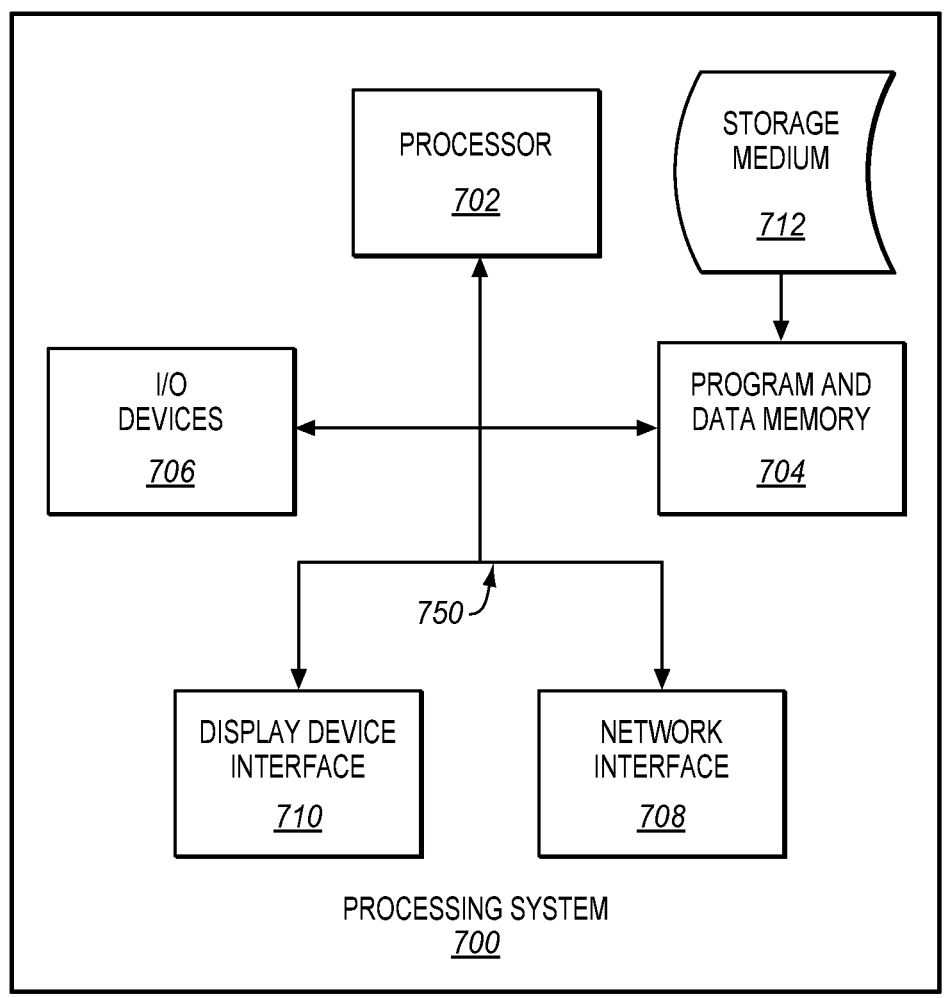
FIG. 7 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the defect detection system 150 to perform the various operations disclosed herein. FIG. 7 illustrates a processing system 700 operable to execute a computer readable medium embodying programmed instructions to perform desired functions in an illustrative embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 710 may be integrated with the system to interface to one or more display devices, such as printing systems and screens for presentation of data generated by processor 702.

Although specific embodiments were described herein, the scope of the invention is not limited to those specific embodiments. The scope of the invention is defined by the following claims and any equivalents thereof.

What is claimed is:

1. A system comprising:
   an interface configured to receive an image of a test chart printed on media by one or more printheads of a printer based on print data;
   memory configured to store defect reference data comprising defect patterns in other images categorized as a delaminated head defect; and
   at least one processor that implements a print defect controller configured to detect a nozzle defect in the image based on a comparison of the image with the print data, and to determine a type of the nozzle defect as the delaminated head defect based on a comparison of image characteristics of the image with the defect patterns in the defect reference data.

2. The system of claim 1 wherein:
   the memory is further configured to store the defect reference data further comprising other defect patterns in the other images categorized as a jet-out defect or categorized as a deviated jet defect; and
   the print defect controller is further configured to determine the type of the nozzle defect as the jet-out defect or the deviated jet defect based on a comparison of the image characteristics of the image with the other defect patterns in the defect reference data.

3. The system of claim 1 wherein:
   the print defect controller implements a trained Deep Neural Network (DNN) to determine the type of the nozzle defect by analyzing pixels of the image in comparison with the defect patterns in the defect reference data; and
   the print defect controller is further configured to operate the trained DNN to determine a confidence level for the type of the nozzle defect.

4. The system of claim 3 wherein:
   the print defect controller is further configured, in response to determining that the confidence level for the type of the nozzle defect is uncertain, to generate a message for display indicating to perform a manual review of the nozzle defect.

5. The system of claim 4 wherein:
the print defect controller is further configured to update the defect reference data based on received manual review data of the nozzle defect.

6. The system of claim 2 wherein:
the print defect controller is further configured to determine the type of the nozzle defect based at least in part on a location of the nozzle defect on the image, and one or more print system settings.

7. The system of claim 1 further comprising:
the printer comprising:
a print engine including the printheads each having a plurality of nozzles configured to eject ink.

8. A method comprising:
receiving an image of a test chart printed on media by one or more printheads of a printer based on print data;
storing, in memory, defect reference data comprising defect patterns in other images categorized as a delaminated head defect;
detecting a nozzle defect in the image based on a comparison of the image with the print data; and
determining a type of the nozzle defect as the delaminated head defect based on a comparison of image characteristics of the image with the defect patterns in the defect reference data.

9. The method of claim 8 wherein:
the defect reference data further comprises other defect patterns in the other images categorized as a jet-out defect or categorized as a deviated jet defect; and
the method further comprises determining the type of the nozzle defect as the jet-out defect or the deviated jet defect based on a comparison of the image characteristics of the image with the other defect patterns in the defect reference data.

10. The method of claim 8 further comprising:
implementing a trained Deep Neural Network (DNN) to determine the type of the nozzle defect by analyzing pixels of the image in comparison with the defect patterns in the defect reference data; and
operating the trained DNN to determine a confidence level for the type of the nozzle defect.

11. The method of claim 10 further comprising:
in response to determining that the confidence level for the type of the nozzle defect is uncertain, generating a message for display indicating to perform a manual review of the nozzle defect.

12. The method of claim 11 further comprising:
updating the defect reference data based on received manual review data of the nozzle defect.

13. The method of claim 9 further comprising:
determining the type of the nozzle defect based at least in part on a location of the nozzle defect on the image, and one or more print system settings.

14. A non-transitory computer readable medium including programmed instructions which, when executed by a processor, are operable for performing a method, the method comprising:
receiving an image of a test chart printed on media by one or more printheads of a printer based on print data;
storing, in memory, defect reference data comprising defect patterns in other images categorized as a delaminated head defect;
detecting a nozzle defect in the image based on a comparison of the image with the print data; and
determining a type of the nozzle defect as the delaminated head defect based on a comparison of image characteristics of the image with the defect patterns in the defect reference data.

15. The medium of claim 14 wherein:
the defect reference data further comprises other defect patterns in the other images categorized as a jet-out defect or categorized as a deviated jet defect; and
the method further comprises determining the type of the nozzle defect as the jet-out defect or the deviated jet defect based on a comparison of the image characteristics of the image with the other defect patterns in the defect reference data.

16. The medium of claim 14 wherein the method further comprises:
implementing a trained Deep Neural Network (DNN) to determine the type of the nozzle defect by analyzing pixels of the image in comparison with the defect patterns in the defect reference data; and
operating the trained DNN to determine a confidence level for the type of the nozzle defect.

17. The medium of claim 16 wherein the method further comprises:
in response to determining that the confidence level for the type of the nozzle defect is uncertain, generating a message for display indicating to perform a manual review of the nozzle defect.

18. The medium of claim 17 wherein the method further comprises:
updating the defect reference data based on received manual review data of the nozzle defect.

19. The medium of claim 15 wherein the method further comprises:
determining the type of the nozzle defect based at least in part on a location of the nozzle defect on the image, and one or more print system settings.

20. The medium of claim 14 wherein the method further comprises:
determining the type of the nozzle defect with a machine learning function using the defect reference data as input to the machine learning function.

21. The system of claim 1 wherein:
the delaminated head defect is exhibited by a defect pattern with a plurality of adjacent nozzles partially blocked or fully blocked.

22. The system of claim 3 wherein:
the print defect controller is further configured to operate the trained DNN to report the confidence level for the type of the nozzle defect.

23. The system of claim 3 wherein:
the print defect controller is further configured to operate the trained DNN to report a nozzle defect location for the nozzle defect.

24. The method of claim 8 wherein:
the delaminated head defect is exhibited by a defect pattern with a plurality of adjacent nozzles partially blocked or fully blocked.

25. The method of claim 10 further comprising:
operating the trained DNN to report the confidence level for the type of the nozzle defect.

26. The method of claim 10 further comprising:
operating the trained DNN to report a nozzle defect location for the nozzle defect.

27. The medium of claim 14 wherein:
the delaminated head defect is exhibited by a defect pattern with a plurality of adjacent nozzles partially blocked or fully blocked.

28. The medium of claim 16 wherein the method further comprises:
   operating the trained DNN to report the confidence level for the type of the nozzle defect.

29. The medium of claim 16 wherein the method further comprises:
   operating the trained DNN to report a nozzle defect location for the nozzle defect.

\* \* \* \* \*